Oct. 22, 1957     W. E. CARPENTER     2,810,660
DIFFUSING REFLECTING COATING AND METHOD OF PREPARING SAME
Filed Feb. 1, 1954
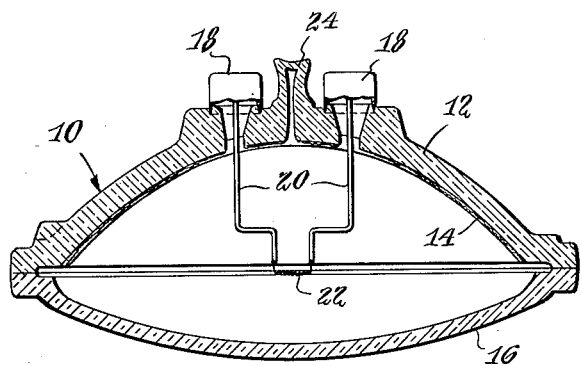
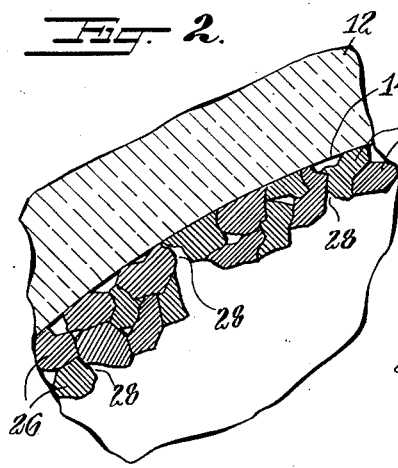
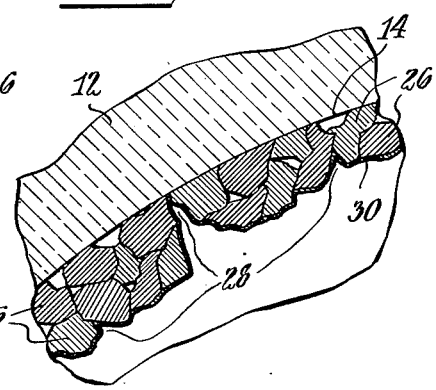
INVENTOR.
W. E. CARPENTER
BY
ATTORNEY.

2,810,660

DIFFUSING REFLECTING COATING AND METHOD OF PREPARING SAME

Walter E. Carpenter, West Caldwell, N. J., assignor to Westinghouse Electric Corporation, East Pittsburgh, Pa., a corporation of Pennsylvania Application February 1, 1954, Serial No. 407,358

1 Claim. (Cl. 117—18)

This invention relates to reflecting coatings and, more particularly, to a diffusing reflecting coating which is adapted for use with a lamp, and to a method for preparing said coating.

Heretofore reflecting coatings for lamps have been made diffusing by sandblasting, grinding or acid etching a glass base surface in order to roughen it, and then applying the reflecting coating to this roughened surface. A diffusing effect has also been achieved by securing glass beads to a glass base by an adhesive and placing a reflecting coating over the beads.

In the case of sandblasting, grinding or acid etching, the glass base is somewhat decreased in thickness and weakened, and stress points are set up. In the case of glass beads which are adhesively attached to the glass base, the light diffusion is incomplete because of the relatively large bead size and the adherence between the beads and the glass base is not entirely satisfactory.

It is the general object of this invention to avoid and overcome the foregoing and other difficulties of and objections to prior art practices by the provision of a diffusing reflecting coating which does not weaken the glass base, which adheres very well to the glass base and which very evenly diffuses light.

It is a further object to provide an even diffusing reflecting coating in which the coarseness of the coating, and thus the diffusing characteristics, may be easily controlled during fabrication.

It is another object to provide a method of fabricating the diffusing reflecting coating.

The aforesaid objects of the invention, and other objects which will become apparent as the description proceeds, are achieved by providing a diffusing reflecting coating comprising a relatively low softening temperature, finely divided glass which is incipiently fused to a relatively high softening temperature glass base, said incipiently fused glass having a reflecting coating thereover. In addition there is provided a method for applying the diffusing reflecting coating whereby the lower softening temperature finely divided glass is first evenly applied to the glass base, which is then heated to a temperature intermediate the softening temperature of the finely divided glass and the glass base to incipiently fuse the finely divided glass onto the glass base. A reflecting coating is then applied over the incipiently fused, finely divided glass.

For a better understanding of the invention, reference should be had to the accompanying drawing, wherein:

Fig. 1 is a sectional elevational view of a sealed beam lamp incorporating the diffusing reflecting coating of this invention;

Fig. 2 is a fragmentary enlargement of a portion of the glass body, before application of the reflecting coating, illustrating the finely divided glass particles incipiently fused to its inner surface;

Fig. 3 is a fragmentary enlargement corresponding to Fig. 2, illustrating the reflecting coating as applied over the incipiently fused, finely divided glass particles;

Fig. 4 is a flow chart illustrating a method of applying the diffusing reflecting coating to the glass body.

Although the principles of the invention are broadly applicable to any type of reflecting coating which to be placed over a glass body, the invention is usually employed in conjunction with a lamp and particularly with a sealed beam lamp and hence it has been so illustrated and will be so described.

With specific reference to the form of the invention illustrated in the drawing, the numeral 10 indicates generally a sealed beam lamp comprising a glass reflector body portion 12, the inner surface 14 of which has a generally paraboloidal configuration. A glass lens 16 is sealed to the periphery of the reflector, as is customary, and the lens and reflector body form the lamp envelope. Ferrules 18 are imbedded into the base of the glass body portion 12 and lead-in conductors 20 are attached to these ferrules by brazing, as is customary. A tungsten filament 22 is supported between the inwardly extending extremities of the lead-in conductors at a location which preferably approximates the paraboloidal focus.

The ferrules 18 and lead-in conductors 20 may be fabricated of nickel-iron and the base portions of the ferrules are adapted for connection with a source of electrical energy (not shown), as is customary. A tipped off exhaust tube 24 is positioned between the ferrules.

There is shown in Fig. 2 a fragmentary enlargement of the layer 26 of finely divided glass particles incipiently fused to the reflector glass base portion 12. The state of incipient fusion in this instance may be defined as a fusion of the glass particles to the extent of adherence to one another and to the reflector base glass. This adherence is effected by heat, but the fusion heat and the duration of its application are insufficient to cause the glass particles to become so very liquid as to form a plane surface by virtue of the surface tension effect experienced at reduced viscosity. As shown, the incipiently fused glass particles will substantially fuse to one another and to the glass base. Many incipient cracks 28, however, will develope due to the contraction of the particles during fusion, and the generally roughened contour of the inner, or exposed glass particle surface will be substantially retained.

The average glass particle size may vary from about 2 microns to about 140 microns, the larger size being determined by a 100 mesh sieve (A. S. T. M. Standards) and the smaller particle size being determined the time of milling of the glass. In the case of an average particle size of about 2 microns, the reflecting surface will have what may be defined as a satin appearance. In the case of an average particle size of about 140 microns, the diffusing reflecting surface will have a much coarser appearance.

The glass base portion 12 of the reflector will always necessarily have a higher softening temperature than the glass particles in order that the glass particles may be incipiently fused without distorting the contour of the glass base 12. Thus the glass base will normally be fabricated of a harder glass than the glass particles. As an example, the glass base 12 may be fabricated of a borosilicate glass as identified by Corning Code No. 7760, which glass has a composition comprising 78.81 parts $SiO_2$, 2.58 parts $Na_2O$, 1.54 parts $K_2O$, 0.16 part $Li_2O$, 14.22 parts $B_2O_3$, 0.05 part $Fe_2O_3$, 1.94 parts $R_2O_3$, and 0.45 part $As_2O_3$.

The composition of the glass particles may vary greatly although it is highly desirable that the incipiently fused glass particles should be of a glass whose coefficient of expansion is not appreciably different from that of the glass base portion 12. As an example, the glass particles may be of a Corning Code Number 7720 glass which has a coefficient of expansion of $36 \times 10^{-7}$ as compared to the Corning 7760 glass which has a coefficient of expansion of $34 \times 10^{-7}$. The composition of the Corning No. 7720 glass is 73.4 parts $SiO_2$, 4.5 parts $Na_2O$, 0.1 part $K_2O$, 5.5 parts PbO, 14.9 parts $B_2O_3$ and 0.4 part $R_2O_3$. As a matter of practicality I have found that if the coefficient of expansion of the glass comprising the glass particles is not more than about 25% greater than the coefficient of expansion of the glass body, the resulting coating will be generally satisfactory. If the coefficient of expansion of the glass comprising the particles and the glass comprising the body are appreciably different, there will be a crazing effect on cooling of the body after fusing of the coating, resulting in weak points and a tendency of the fused coating to peel and flake off.

In preparing the glass particles, I first ball-mill the batch glass for a period which may vary according to the average particle size desired. To achieve the stain finish, the batch glass is ball-milled for about 24 hours, and in the event the coarser 140 micron coating is desired, a ball-milling period of about one to two hours is satisfactory, screening the milled particles through a 100 mesh sieve after this relatively short milling period. For intermediate particle sizes between the aforementioned extremes, the milling time may be varied accordingly, screening with a mesh about 5% larger than the average particle size desired.

The powdered glass is suspended in a vehicle such as isopropyl alcohol by ball-milling the vehicle and the glass particles together to form a "paint." Any vehicle which will readily volatilize and which will not react with the glass particle may be used. This "paint" is then flushed, flowed or sprayed over the inner surface 14 of the reflector glass body portion 12 and the vehicle subsequently volatilized. An example, 100 grams of glass may be ball-milled with 100 cc. of vehicle to form a "paint" which will produce a satisfactory, even coating. After the vehicle is volatilized there remains a thin powdered glass coating over the reflector body portion inner surface 14.

An alternative method of applying the finely divided glass to the glass base portion 14 is to heat the glass base portion 14 to a temperature of about ⅝ of its softening temperature, or about 500° C. in the case of the example given. The glass powder can then be dusted onto the heated glass base. This method is not as generally satisfactory from the aspect of an even coating, however, as flushing with the "paint."

The thickness of the particle layer 28 is not particularly critical and, as an example, may vary between about 0.25 mil to 1 mil.

The particle coated glass body portion 12 is then subjected to a temperature which is approximately 35° C. above the softening temperature of the glass particles, for a period of about 2 minutes, in order to effect incipient fusion. In the case of Corning Code No. 7720 glass, this incipient fusion temperature is about 790° C. It is obvious to those skilled in the art that the fusion temperature may be varied considerably by varying the time for application of the fusion heat, and the foregoing figures have only been given by way of example and not by way of limitation. Summarizing, the incipient fusion may be effected by subjecting the glass particle coated glass body portion 12 to a temperature which is intermediate of the glass particle softening temperature and the glass body portion 12 softening temperature, for a sufficient time to effect incipient fusion of the glass particles.

It is also obvious that glasses other than those specified in the foregoing illustrations may be substituted for the glass particles and the glass body portion 12, provided the glass body portion is of a harder glass than the particles so that incipient fusion may be effected without deforming the glass body portion.

After fusion is effected the fused particle coating is aluminized or silverized by well-known vacuum metallizing sealed beam lamp fabricating techniques to form the reflecting coating. A representative coating thickness is about $1.50 \times 10^{-4}$ mm., although this coating thickness may be varied somewhat if desired. Such a relatively thin coating will substantially conform to all of the incipient cracks and the contour variations of the fused particle coating, and the reflecting diffusing coating 30 is illustrated in the fragmentary enlargement of Fig. 3.

After aluminizing, the lead-in conductors 20 are brazed to the ferrules and the filament 22 mounted, as is customary. The lens 16 is then sealed to the reflector periphery, the lamp evacuated and the exhaust tube tipped off, as is customary.

It will be recognized that the objects of the invention have been achieved by providing a diffusing, reflecting coating which does not weaken the base portion of the reflector and which coating adheres very well to the base portion of the reflector. In addition, the diffusing characteristics of the reflecting coating (i. e., the coarseness or fineness of the coating) may be easily controlled during fabrication by preselection of the glass particle size, and a method has been provided for fabricating the diffusing reflecting surface.

While in accordance with the patent statutes, one best-known embodiment of the invention has been illustrated and described in detail, it is to be particularly understood that the invention is not limited thereto or thereby.

I claim:

The method of forming a diffusing reflecting coating on a portion of a lamp envelope comprising, applying a layer of finely divided glass particles to the portion of said lamp envelope which is to be made reflecting, said glass particles having a softening temperature which is less than the softening temperature of said lamp envelope portion which is to be made reflecting, heating said glass particle coated envelope portion to a temperature intermediate the softening temperature of said glass particles and the softening of said glass particle coated envelope portion for a sufficient time to effect only an incipient fusion between said glass particles and said glass particle coated envelope portion, and forming on said incipiently fused glass particles by vacuum-metallizing, a thin reflecting coating of one of the group consisting of aluminum and silver.

References Cited in the file of this patent

UNITED STATES PATENTS

| | | |
|---|---|---|
| 847,881 | Baumgarn | Mar. 19, 1907 |
| 1,008,902 | Haehnel | Nov. 14, 1911 |
| 1,610,062 | Lokker et al. | Dec. 7, 1926 |
| 1,830,165 | Gustin | Nov. 3, 1931 |
| 1,852,840 | Fuwa et al. | Apr. 5, 1932 |
| 1,854,988 | Fuwa et al. | Apr. 19, 1932 |
| 1,887,144 | Wilczynski | Nov. 8, 1932 |
| 2,169,194 | Geyer et al. | Aug. 8, 1939 |
| 2,264,152 | Rowland | Nov. 25, 1941 |
| 2,387,038 | Owens | Oct. 16, 1945 |
| 2,289,978 | Malter | July 14, 1952 |
| 2,744,209 | Ferguson | May 1, 1956 |